United States Patent
Lorello et al.

(10) Patent No.: US 6,459,904 B1
(45) Date of Patent: *Oct. 1, 2002

(54) SHORT MESSAGE SERVICE NOTIFICATION BETWEEN MULTIPLE SHORT MESSAGE SERVICE CENTERS

(75) Inventors: Timothy J. Lorello, Gambrills, MD (US); Reuben D. Hart, Odenton, MD (US)

(73) Assignee: TeleCommunication Systems, Inc., Annapolis, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/477,711

(22) Filed: Jan. 5, 2000

Related U.S. Application Data

(63) Continuation of application No. 09/322,929, filed on Jun. 1, 1999, now Pat. No. 6,208,870.
(60) Provisional application No. 60/105,774, filed on Oct. 27, 1998.

(51) Int. Cl.$^7$ ................................................. H04Q 7/20
(52) U.S. Cl. .......................... 455/466; 455/414; 455/433
(58) Field of Search .......................... 455/403, 412, 455/433, 466, 414, 561, 445, 567, 413

(56) References Cited

U.S. PATENT DOCUMENTS

| | | | | |
|---|---|---|---|---|
| 5,351,235 A | * | 9/1994 | Lahtinen | 370/259 |
| 5,579,372 A | * | 11/1996 | Om | 455/412 |
| 5,592,535 A | | 1/1997 | Klotz | 379/58 |
| 5,628,051 A | | 5/1997 | Salin | 455/33.1 |
| 5,682,600 A | * | 10/1997 | Salin | 455/46 |
| 5,768,509 A | | 6/1998 | Günlük | 395/200.33 |
| 5,787,357 A | * | 7/1998 | Salin | 455/466 |
| 5,794,142 A | | 8/1998 | Vanttila et al. | 455/419 |
| 5,797,094 A | | 8/1998 | Houde et al. | 455/412 |
| 5,797,096 A | | 8/1998 | Lupien et al. | 455/433 |
| 5,806,000 A | | 9/1998 | Vo et al. | 455/466 |
| 5,822,700 A | | 10/1998 | Hult et al. | 455/466 |
| 5,930,701 A | * | 7/1999 | Skog | 455/415 |
| 5,946,630 A | * | 8/1999 | Willars et al. | 455/466 |
| 5,987,323 A | * | 11/1999 | Huotari | 455/433 |
| 6,208,870 B1 | * | 3/2001 | Lorello et al. | 455/412 |
| 6,263,212 B1 | * | 7/2001 | Ross et al. | 370/428 |
| 6,292,669 B1 | * | 9/2001 | Meuronen et al. | 455/412 |

* cited by examiner

Primary Examiner—William Trost
Assistant Examiner—Congvan Tran
(74) Attorney, Agent, or Firm—William H. Bollman

(57) ABSTRACT

A short message service (SMS) network allows more than one short message service center (SMSC) to service an individual subscriber with virtually no modification to the existing conventional network elements, e.g., the home location register (HLR) or the mobile switching center (MSC). In a disclosed embodiment, the HLR of the SMS network sends a notification, e.g., an SMS notification (SMSNOT) signal, to a predetermined one of the plurality of SMSCs in the SMS network when a subscriber becomes available to receive a pending short message from at least one of the plurality of SMSCs. Each of the plurality of SMSCs in turn delivers short messages to an intended subscriber, and then forwards the notification signal to another one of the SMSCs, until all of the SMSCs have delivered the respective pending short messages. The next SMSC to which the SMSNOT is forwarded may be fixedly determined, e.g., by network configuration. Moreover, the path for forwarding the SMSNOT signal may be reconfigured when one or more SMSCs are added to the SMS network. Alternatively, the forwarding path may be determined dynamically by the preceding SMSC in accordance with an intelligent rule based on parameters such as, for example, the type of short message(s) that was retained by the preceding SMSC, the address the intended subscriber, the type of intended subscriber, etc. The path may also be determined by a combination of fixed and dynamic selection. For instance, the selection of the next SMSC may normally be fixed, and upon an occurrence of a predetermined event, dynamic selection based on the intelligent rule(s) may be triggered.

19 Claims, 9 Drawing Sheets

| SMS Teleservice Identifier | MIN | ESN | Dest. Addr. | SMSNOT Indicator | Orig. Dest. Addr. | Orig. Orig. Addr. | Orig. Addr. | Data |
|---|---|---|---|---|---|---|---|---|
| 301 | 302 | 303 | 304 | 305 | 306 | 307 | 308 | 309 |

Fig. 3

SHORT MESSAGE SERVICE NOTIFICATION BETWEEN MULTIPLE SHORT MESSAGE SERVICE CENTERS

This application is related to and claims priority from U.S. provisional application, serial No. 60/105,774, entitled "Pending Message Notification Scheme in Wireless System", and filed on Oct. 27, 1998, and is a continuation of and claims priority from U.S. application Ser. No. 09/322,929, entitled "Short Message Service Notification Between Multiple Short Message Service Centers" (Amended), and filed on Jun. 1, 1999, now U.S. Pat. No. 6,208,870, both of which are explicitly incorporated herein by reference.

BACKGROUND OF THE INVENTION

1. Field of the Invention

The present invention relates generally to communications networks. More particularly, the present invention relates to a method and apparatus for delivering short message service (SMS) messages to a subscriber, particularly in a wireless communication network including a plurality of short message service centers (SMSC).

2. Background of Related Art

In order to accommodate a society which is becoming increasingly mobile, and to meet the ever-increasing need for communications, the telecommunication industry in particular has been providing wireless communication services.

The wireless communication services traditionally included voice cellular phone and paging services in which a user can make a telephone call or send/receive a page including a numeric message indicating a telephone number over a wireless network. More recently, paging services have been, expanded to offer alphanumeric paging, which allows a short text based message to be sent to and displayed at a handheld pager.

However, voice cellular telephone and the paging services each require an intended subscriber to be on-line or active to receive a telephone call or transmitted paging message. In other words, these services do not typically offer the capability of storing the messages for a temporarily unavailable subscriber.

In the early 1990s, as a result of the growing popularity of digital wireless technology, a standard for digital wireless networks was introduced in Europe. That standard, now known as the global standard for mobiles (GSM), included a service called short messaging service (SMS). An SMS allows transmission of short messages, typically up to 160 characters, to and from communication devices, e.g., cellular telephone handsets, telephones or computers with appropriate modems. In North America, the SMS is currently implemented on digital wireless/mobile networks, such as a PCS network based on the GSM standard, code division multiple access (CDMA) and/or time division multiple access (TDMA) methods. Short message services are gaining in popularity, particularly in the United States.

Short message services are advantageous over text based paging services because of the capability of bi-directional communication. Such bi-directional communication allows, for example, notification to the originating device of the success or failure of the short message delivery.

Moreover, each SMS network typically includes a short message service center (SMSC) which acts as a store-and-forward mechanism providing guaranteed delivery of short messages to a subscriber, even if the subscriber is inactive when the message was transmitted, by delivering the short messages once the subscriber becomes active. Delivery of all short messages is guaranteed regardless of whether or not the intended subscriber is "on-line" because the transmitted short message is stored within the one SMSC assigned to each intended subscriber, and delivered to the intended subscriber from their assigned SMSC when the subscriber becomes available.

A variety of services have been introduced using SMS networks including, for example, integrated electronic mail and fax, integrated paging, interactive banking, and information services such as stock quotes and airline schedule delivery.

Unfortunately, conventional SMS networks have been somewhat limited in their utility because they are based on the concept of a single SMSC assigned to service any one particular subscriber. Thus, a particular subscriber is limited to a single message delivery channel between itself and the SMSC that services it. Moreover, because of the singular SMSC architecture of conventional SMS networks, it is difficult if not impossible to upgrade or perform maintenance on an SMS network without affecting and/or suspending the short message service at least with respect to the subscribers assigned to that SMSC.

In operation, an SMSC receives a short message from any source intended to be delivered to a particular subscriber. When the intended subscriber is not available because, for example, it is turned off or is outside of the service area of the SMS network, the attempt to deliver the short message at that time will fail. In this case, the short message will be retained in the SMSC assigned to that intended subscriber for a later delivery attempt. Thereafter, when the subscriber finally becomes available, e.g., is turned on or has moved into the service area of the SMS network, the relevant portions of the network (e.g., the mobile servicing center (MSC) and the home location register (HLR)) notify the SMSC to initiate delivery of the stored (i.e., previously failed) short messages.

A conventional SMS network notifies only the servicing SMSC that an intended subscriber can again receive short messages. Thus conventional SMS networks do not have more than one SMSC assigned to any one particular subscriber.

In order to fully appreciate the above shortcomings of a conventional SMS network, an exemplary conventional SMS network will now be described in detail. Although the following example is described using terms and protocols mainly as defined by the North American standard IS-41, it will be apparent to one skilled in the art that the example is applicable to any networks that offer store-and-forward type short message service.

FIG. 5 shows an exemplary structure of a SMS network 500. The SMS network 500 typically includes one short message service center (SMSC) 501. The SMSC 501 typically includes a storage subsystem to store short messages that had failed to be delivered. The SMSC 501 typically further includes various interfaces (not shown) to receive short messages originating from various sources and protocols, such as a Voice Mail System (VMS) 508, paging networks using, e.g., Telocator Numeric Paging Protocol (TNPP) 509, devices using the Short Message Peer-to-Peer (SMPP) protocol 510 via TCP/IP, e-mail systems using the Simple Mail Transport Protocol (SMTP) 511, and/or devices using the Telocator Alphanumeric Protocol (TAP) 512. Some of the various sources of the short messages may be gateways to other networks.

The SMSC 501 may further include a gateway/interworking block (not shown) that enables the SMSC 501 to communicate with the rest of the SMS network 500, such as a Home Location Register (HLR) 503 or a Mobile Switching Center (MSC) 505, using the Signaling System No. 7 (SS7) 502. The methods and mechanism of communication in the SMS network 500 are defined by the mobile application part (MAP) layer, which uses the services of the SS7 transaction capabilities application part (TCAP) as the signaling infrastructure of the SMS network 500. The protocol for the signaling is referred to as the IS-41 protocol under the American standard as published by the Telecommunication Industry Association (TIA) or as the GSM MAP under the European standard published by European Telecommunication Standards Institute (ETSI).

The Home Location Register (HLR) 503 includes a database that permanently stores and manages subscriptions and service profiles of users having a subscription to the SMS network 500. Although only one HLR 503 is shown, the SMS network 500 may include two or more HLRs. The SMS network 500 also typically includes several visitor location registers (VLR) 504. A VLR 504 is a database temporarily holding information about visiting subscribers who move into its service area. Thus, a VLR 504 contains information regarding routing information for all subscribers within its service area, and informs the relevant HLR 503 of the availability and routing information regarding its subscribers. The mobile switching center (MSC) 505 obtains subscriber information from the VLR 504 to service visiting subscribers.

The mobile switching center (MSC) 505 performs switching and call control functions, and receives short messages from the SMSC 501 for delivery to the appropriate mobile subscriber 507 (shown, e.g., as a cellular phone handset). It is to be understood that, although only one MSC 505 is shown, the wireless network 500 may include two or more MSCs. The base station subsystem (BSS) 506 handles the wireless communications, e.g., RF transmission and reception of voice and data traffic, to and from the mobile subscriber 507. The BSS 506 is typically composed mainly of two parts: the base transceiver station (BTS, not shown) which houses the radio transceivers that define a cell and handles the radio-link protocols with the mobile subscriber 507, and the base station controller (BSC, also not shown) which manages the radio resources, and handles radio channel set up, frequency hopping, and handoffs (or handovers as is sometimes referred as). The BSC is the interface between the MSC 505 and the subscriber 507. The subscriber 507, also sometimes referred to as a mobile station (MS), typically consists of mobile equipment (e.g., a cellular phone handset) preferably uniquely identifiable by an identifying number, e.g., mobile identification number (MIN), International mobile subscriber identification (IMSI) and/or electronic serial number (ESN), for the subscriber 507. The mobile equipment may include a storage area, e.g., a flash memory, a ROM, a RAM or the like to hold the unique identifying number within the mobile equipment. In GSM networks, a smart card, typically referred to as a subscriber identity module (SIM) is utilized to store a unique identifying number.

FIG. 6 shows an exemplary flow of a short message through a conventional SMS network. Although FIG. 6 shows only an example of short message delivery to a mobile subscriber, it is to be understood that a mobile subscriber or any other sources may originate a short message. The flow of a mobile subscriber originated short message would involve similar processes as the following mobile subscriber terminated short message example, and would be apparent to one of ordinary skill in the art.

The SMSC 601 receives a short message intended for a subscriber 604 from a source of short message 605 which may be any one or more of the aforementioned sources of short messages, e.g., 508–512 of FIG. 5. Upon receiving a short message, the SMSC 601 sends a request for routing information, i.e., an SMS request (SMSREQ), to the HLR 602. The HLR 602 maintains information regarding the availability of the intended subscriber 604 and the appropriate MSC 603 that services the intended subscriber, and sends the information as routing information 608 back to the SMSC 601. The SMSC 601 forwards the short message to the appropriate MSC 603 using the routing information 608 received from the HLR 602, for example, in accordance with the short message delivery point-to-point (SMDPP) mechanism of IS-41 standard. The MSC 603 queries the VLR (not shown) for subscriber information. The VLR may perform a paging and authentication process, and sends the subscriber information to the MSC 603. The MSC 603, using the information received from the VLR, delivers the short message to the intended subscriber 604, and sends a delivery report 612 to the SMSC 601. The SMSC 601 may send the result of the delivery, i.e., the status report 613, to the source of the short message 605 if requested.

When the attempted delivery of the short message has failed because, for instance, the intended user was out of the service area, or had his or her communication device turned off, the MSC 603 informs the HLR 602 of the failure. The HLR 602 then turns on an SMS notification indicator flag for the subscriber, and the SMSC 601 retains the failed message for a later delivery attempt.

FIG. 7 shows a pending short message delivery process in a conventional short message service network after the mobile subscriber becomes available for delivery of the retained messages. In particular, in FIG. 7, when the subscriber 704 turns his or her handset on or comes within the service area, the subscriber's handset sends a registration signal 709 to the MSC 703. The registration signal 709 may or may not include authentication process.

Upon receiving the registration signal 709, the MSC 703 informs the HLR 702 (or the VLR 711) of the availability of the subscriber 704 by sending a subscriber available signal 708. Because the SMS notification flag for the subscriber is on, the HLR 702 or the VLR 703 sends an SMS notification (SMSNOT) message 705 in case of networks implementing IS-41 standard, or an equivalent notification alerting the fact that the subscriber has become available in networks implemented in accordance with other standards, to the SMSC 701 assigned to service that particular intended subscriber 704.

The SMSC 701 then sends a delivery request 706 to the MSC 703 via, for example, the SMDPP protocol in the IS-41 standard. The MSC 703 finally delivers the short message 710 to the subscriber 704, and sends a message delivered message 707 back to the SMSC 701 to confirm and finalize the delivery of the short message. The SMSC 701 may further send a delivery report to the source of the short message if it was requested.

As can be appreciated, the conventional SMS networks are implemented with only one SMSC in the network servicing any particular subscriber and thus provides the HLR 702 without the ability to alert more than one SMSC of the fact that the subscriber has become available. Thus, a particular subscriber is limited to having only one short message delivery channel, typically from a single provider.

More recently, systems have been developed that attempt to employ more than one SMSC assigned to a particular subscriber, and thus attempt to provide multiple short message delivery channels. However, these attempted systems require extensive modifications to the conventional SMS network, adding unnecessary complexity, incompatibility with an otherwise conventional SMS network, and typically require service outage to subscribers while additional short message channels are being added.

In particular, U.S. Pat. Nos. 5,682,600 ("the '600 patent") and 5,787,357 ("the '357 patent"), both to Salin, describe known SMS networks having more than one SMSC. Both patents propose the use of a list (kept by the system, e.g., by the HLR) of addresses of SMSCs that have tried and failed to deliver short messages intended for a particular subscriber who is unavailable to receive the messages at the time. When the subscriber becomes available, the system notifies all such SMSCs on the list.

However, as described by the '600 patent and the '357 patent, when there is more than one SMSC retaining short messages intended for the same subscriber, each SMSC will try, nearly simultaneously to each other, to initiate the forwarding of respective short messages to the subscriber upon being notified of the availability of the subscriber. Because only one short message can be transmitted to a subscriber at any one time, a short message collision occurs causing the receipt of negative acknowledgements prompting further storing of the rejected short messages in their respective SMSCs for a later attempted delivery. The situation will continue as long as there are more than one SMSC attempting to send a short message to the same subscriber, and has the potential of delaying delivery of even the initial short message to the intended subscriber. These exchanges of repeated unsuccessful attempts and the negative acknowledgements can result in a significant amount of extra traffic that may tend to waste available bandwidth of the network. Moreover, this problem becomes exacerbated if the subscriber had been unavailable for a long period of time and/or the subscriber received messages from many different sources during his absence, both of which tends to cause the stored buildup of large number of short messages.

To cure the problem after the first collision (and delay) has occurred, the '600 patent and the '357 patent propose a delay mechanism in the system to add delays between notifications to each of the SMSCs to avoid a simultaneous transmission of messages by multiple SMSCs. The short messages are stored in the system queue and forwarded one short message at a time by monitoring the respective completion of delivery of each short message.

The '600 patent requires the home location register (HLR) of the system to keep track of the addresses of SMSCs with failed message deliveries, and added delays between the notifications to the SMSCs, both of which result in added complexity to a conventional HLR.

The '357 patent requires a list kept in the HLR, added memory to the mobile switching center (MSC) memories to store and queue the short messages, and a mechanism to monitor the delivery process, e.g., to detect the completion of delivery of one short message in order to start the delivery of the next short message. Thus, '357 patent also adds significant complexity and cost to a conventional SMS network.

Moreover, both the solutions proposed by the '600 patent and the '357 patent require the SMS network to create and maintain a list of addresses of SMSCs, and to determine which and when SMSCs are to be notified, based on the list. This adds a source of error that may result in a wrong SMSC receiving the notification, resulting in failure of pending message delivery.

Moreover, and very importantly, the '357 and '600 patents require extensive communication and monitoring of SMSCs, which are often manufactured by different companies at different times, and may therefore be quite incompatible with one another.

The added complexity of the network must also be provided for by the appropriate standards and/or protocols in order for the system to be seamlessly compatible with other networks.

Furthermore, SMS networks such as those described in the '600 and '357 patents are difficult to upgrade, expand and/or reconfigure, i.e., by adding more SMSCs, without significantly affecting the remaining portions of the SMS network, i.e., requiring significant modifications to the HLR and/or the MSC.

There is thus a need for an architecture and method for a SMS network that allows inclusion of multiple SMSCs without requiring significant and complex modification to the remaining SMS network elements, that can be easily upgraded, expanded and/or reconfigured, and that does not require the error prone creation of and selection from a list of addresses of SMSCs. Thus, there is a need for a more reliable and robust method and apparatus for delivering pending short messages to a subscriber from a plurality of SMSCs.

SUMMARY OF THE INVENTION

In accordance with the principles of the present invention, a short message service (SMS) network adapted to send and receive short messages to and from communication devices subscribing to the SMS network allowing more than one short message service center (SMSC) to service an individual subscriber is provided. The SMS network, according to the principles of the present invention, comprises at least one home location register (HLR) that sends an SMS notification (SMSNOT) message, or an equivalent notification message thereof, to one predetermined SMSC among a plurality of SMSCs once a subscriber becomes available to receive at least one pending message from at least one of the plurality of SMSCs.

The SMS network, according to the principles of the present invention, may further comprise a predetermined SMSC among the plurality of SMSCs forwarding the SMS-NOT signal to an another SMSC among the plurality of SMSCs upon completion of the delivery of messages retained by the predetermined SMSC or upon determination that no message intended for the subscriber is stored at the predetermined SMSC. The next SMSC to which the SMS-NOT is to be forwarded by the predetermined SMSC may be fixedly configured when the SMS network is configured, i.e., at initial configuration and/or during subsequent configurations, such as when one or more SMSC are being added.

Alternatively, the next SMSC to receive the SMSNOT signal may be determined dynamically by the preceding SMSC in accordance with an intelligent rule based on parameters, for example, the type of message that was retained by the preceding SMSC, the address of the intended subscriber and/or the type of the intended subscriber.

The selection of the next SMSC may normally be fixed, and upon the occurrence of a predetermined event, dynamic selection based on the intelligent rules may be triggered.

Each of the plurality of SMSCs of the inventive SMS network may forward an SMSNOT message to a fixedly or dynamically determined subsequent SMSC until all SMSCs of the plurality of SMSC have received the SMSNOT signal.

The plurality of SMSCs of the inventive SMS network may be arranged in a daisy chain arrangement.

The SMS network, according to the principles of the present invention, may further comprise an SMSC, among the plurality of SMSCs, predetermined to be the last SMSC which does not forward the SMSNOT signal.

In addition, in accordance with the principles of the present invention, a method of sending and receiving short messages to and from communication devices subscribing to a short message service (SMS) network that allows more than one short message service center (SMSC) to service an individual subscriber is provided. The method, according to the principles of the present invention, comprises providing at least one home location register (HLR) that sends an SMS notification (SMSNOT) signal to one predetermined SMSC among a plurality of SMSCs upon a subscriber becoming available to receive at least one pending message from at least one of the plurality of SMSCs.

The method, according to the principles of the present invention, may further comprise forwarding of the SMSNOT signal by the predetermined SMSC among the plurality of SMSCs to another SMSC among the plurality of SMSCs upon completion of the delivery of messages retained by the predetermined SMSC or upon a determination that no message intended for the subscriber is stored at the predetermined SMSC. The method may further comprise determining the next SMSC to which the SMSNOT is to be forwarded according to a fixedly configured SMS network configuration, i.e., as configured at initial configuration and/or during subsequent configurations, such as when one or more SMSC is being added.

The method may further comprise dynamically determining the next SMSC to receive the SMSNOT signal from the preceding SMSC in accordance with an intelligent rule based on parameters, for example, the type of message that was retained by the preceding SMSC, the address of the intended subscriber and/or the type of the intended subscriber.

The method may further comprise selection of the next SMSC to forward the SMSNOT signal determined by a combination of fixed and dynamic selection. Thus, the selection of the next SMSC may normally be fixed, and upon the occurrence of a predetermined event, the dynamic selection may be triggered.

The method may further comprise forwarding of the SMSNOT signal by each of the plurality of SMSCs of the inventive SMS network to a fixedly or dynamically determined subsequent SMSC until all of the plurality of SMSCs have received the SMSNOT signal.

The method may further comprise the arrangement of the plurality of SMSCs of the inventive SMS network in a daisy chain arrangement.

The method may further comprise providing an SMSC, selected from among the plurality of SMSCs, predetermined to be the last SMSC which does not forward the SMSNOT signal.

BRIEF DESCRIPTION OF THE DRAWINGS

Features and advantages of the present invention will become apparent to those skilled in the art from the following description with reference to the drawings, in which:

FIG. 3 shows an illustrative example of the format of a delivery request message, in accordance with the principles of the present invention.

DETAILED DESCRIPTION OF PREFERRED EMBODIMENTS

For simplicity and illustrative purposes, the principles of the present invention are described by referring mainly to IS-41 protocol terminology. However, one of ordinary skill in the art would readily recognize that the same principles are equally applicable to and can be implemented in any wireless networks with store-and-forward short messaging using any other suitable standards and/or any other suitable protocols.

For example, although throughout the foregoing disclosure, examples of a home location register (HLR) sending a short message service notification (SMSNOT) message are described, the notification may be other than a SMSNOT message, for example, the use of the "alert service center" mechanism in GSM system, or any other equivalent notification mechanisms used as a notification that the intended subscriber has become available to receive pending messages under any other standards or protocols, would be apparent to one of ordinary skill in the art, and would be within such modifications that do not depart from the true spirit and scope of the present invention.

Furthermore, the notification may be sent by a network entity other than the HLR, for example, a visitor location register (VLR) may instead sent a notification directly to an SMSC. The sending of the notification by a VLR instead of an HLR is also contemplated by the present invention, would equally be applicable to the foregoing descriptions, examples and disclosures, would be apparent to one of ordinary skill in the art, and would be within such modifications that do not depart from the true spirit and scope of the present invention.

FIGS. 1 through 4A show an exemplary pending short message delivery process and the Short message service center in accordance with the principles of the present invention.

Figure 1:
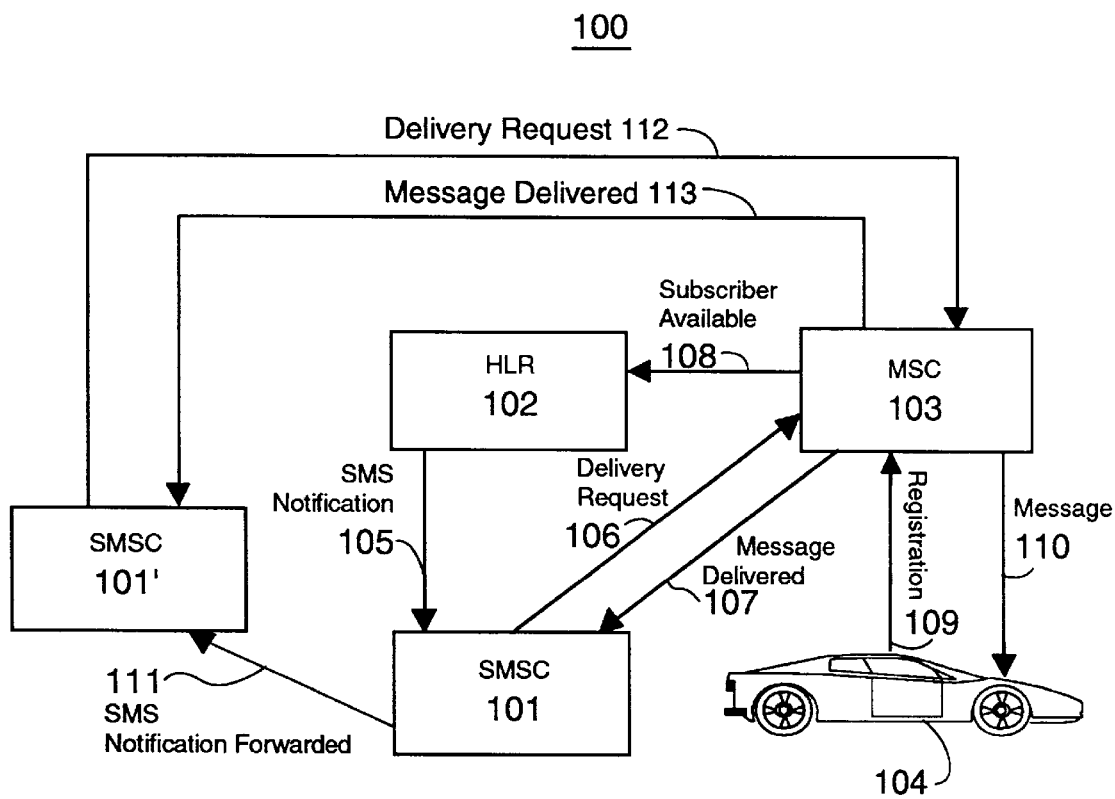
FIG. 1 shows an illustrative example of a pending short message delivery process in a short message service (SMS) network, in accordance with the principles of the present invention.
Figure 7:
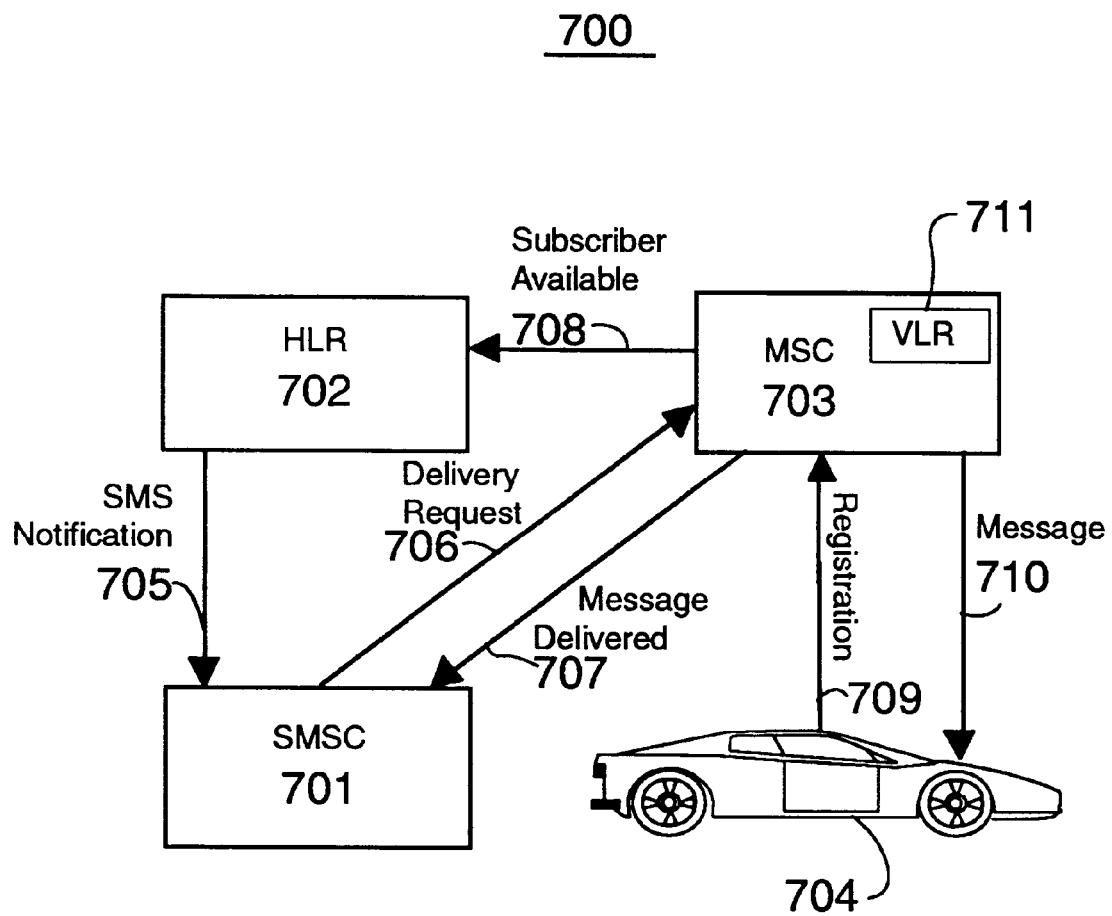
FIG. 7 shows a pending message delivery process in a conventional short message service network.

FIG. 1 shows an illustrative example of a pending short message delivery process in a short message service (SMS) network, in accordance with the principles of the present invention. As shown in FIG. 1, and in contrast to the example of FIG. 7 of a conventional system having only one SMSC, the SMS network 100 of the present invention may include two or more SMSCs, e.g., SMSC 101 and 101', servicing a particular subscriber 104. Although, in this illustrative example, only two SMSCs 101 and 101'are shown, it is to be understood that the inventive SMS network may include any number of SMSCs.

Figure 1A:
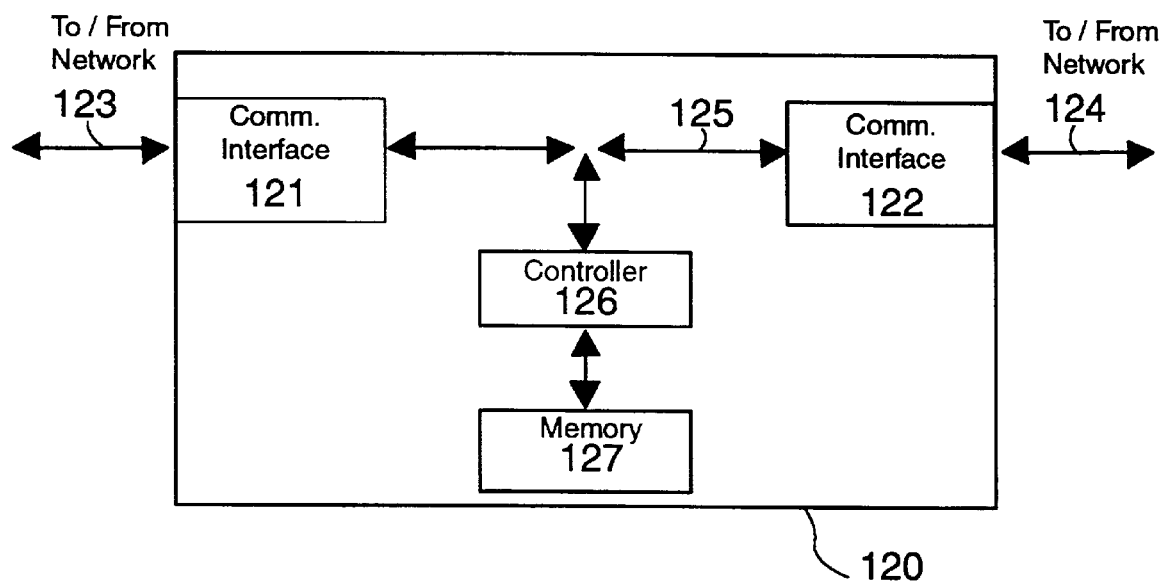
FIG. 1A shows an illustrative example of the relevant portions of a short message service center (SMSC), in accordance with the principles of the present invention.
Figure 5:
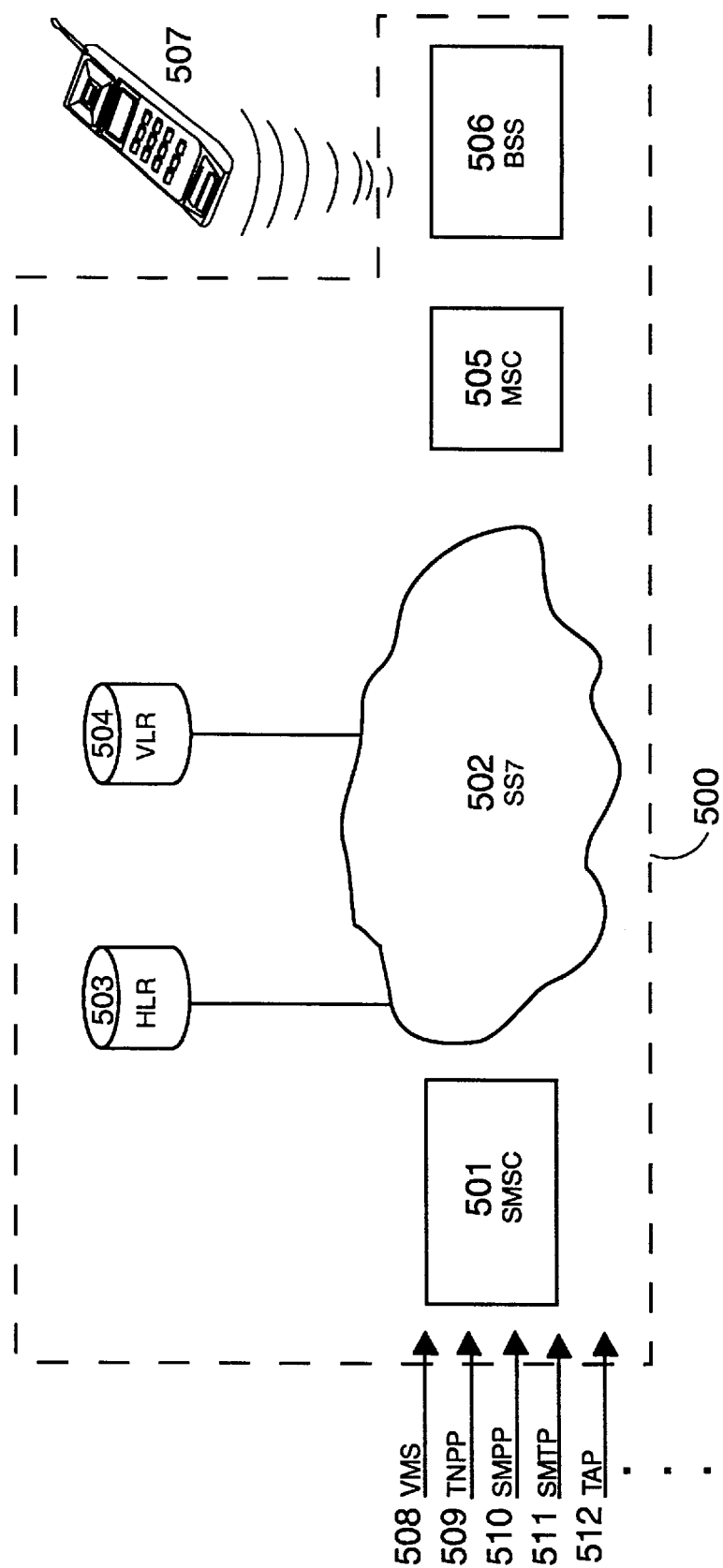
FIG. 5 shows relevant portions of a conventional short message service network.

FIG. 1A shows an illustrative example of the relevant portions of an SMSC, in accordance with the principle of the present invention. The SMSC 120 may include one or more communication interfaces, e.g., communication interfaces 121 and 122, to communicate with the rest of the network elements, such as one or more of the aforementioned sources of short messages, e.g., 508–512 of FIG. 5, the HLR, MSC and/or the VLR, etc., via one or more communication channels, e.g., the communication channels 123 and 124.

The SMSC 120 may further include a controller 126 that controls the communications between the SMSC 120 and the rest of the network via the interfaces 121 and 122, the storage and retrieval of short message(s) in memory 127, and receipt and delivery of short messages to and from the rest of the network.

The controller 126 may be in the form of any conventional microcontroller, microprocessor, or the like, and may implement the above control functions and all of the processes of the present inventive SMSC as will be described in the foregoing description of SMSC 101 and 101', via hardware and/or software implementation. In a preferred embodiment of the present invention, the above control functions are implemented by appropriate software residing either in an internal memory of the controller 126 or in the memory 127. The control software is re-configurable/updateable via the network by a network administrator for easy accommodation of upgrade/update of the network.

Referring again to FIG. 1, when a subscriber 104 becomes available to receive short messages, for example, by turning his or her handset on or by coming within the service area, the subscriber's handset sends a registration signal 109 which may include authentication processes to a VLR (not shown).

Upon receiving the registration signal 109, the VLR informs the HLR 102 of the availability of the subscriber 104 by sending a subscriber available signal 108, e.g., a registration notification message (REGNOT). Because at least one previous attempt to deliver a short message had failed, the HLR 102 has the SMS notification flag for the subscriber turned on. Thus, the HLR 102 sends a SMSNOT message 105 to the SMSC 101.

According to the principles of the present invention, the HLR 102 sends the SMSNOT message 105 to only one SMSC, e.g., SMSC 101, which is designated to receive the SMSNOT message 105 from the HLR 102. Any one SMSC among a plurality of SMSCs may be designated to receive the SMSNOT message 105 from the HLR 102. The designation can be made as part of the network configuration at any time, for example, during the initial configuration, or during any subsequent configuration, during maintenance, during upgrade or during expansion of the SMS network.

To the HLR 102, it appears that there is only one SMSC in the SMS network 100. Thus, it can be appreciated that the SMS network 100 according to the principles of the present invention requires virtually no modification to a conventional HLR. In a legacy SMS network, the one SMSC may be the original one assigned to the intended subscriber, thus avoiding the need to modify the HLR in accordance with the principles of the present invention.

Figure 2A:
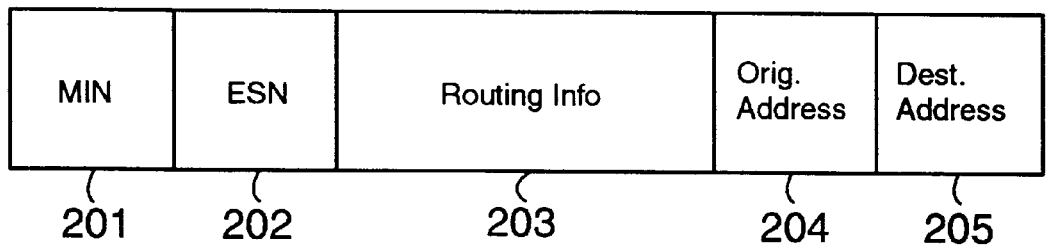
FIG. 2A shows an illustrative example of the format of a short message service notification (SMSNOT) message, in accordance with the principles of the present invention.

FIG. 2A shows a simple exemplary format of an SMSNOT message 105. The SMSNOT message 105 may include fields or information other than what is shown in FIG. 2A, e.g., CRC information, and/or may have fields or information in order different than shown in FIG. 2A. The exemplary message format is intended for illustration purposes only, and is not (and should not be construed as) the only possible format.

In FIG. 2A, the SMSNOT message 105 may include, inter alia, a mobile identification number (MIN) 201, an electronic serial number (ESN) 202, and/or routing information 203. The MIN 201 and ESN 202 together identify a particular subscriber, i.e., the intended subscriber 104 of FIG. 1. The routing information 203 enables an SMSC to determine to which MSC it needs to forward short messages pending for the intended subscriber identified by the MIN 201 and ESN 202. Because the SMSNOT message is sent via a point-to-point messaging mechanism of the TCAP layer of SS7 in this example, the SMSNOT message 105 as received by the SMSC 101 may include an origination address 204, which is the address of the HLR in this case, and a destination address 205, which is the address of the SMSC 101 in this example.

Upon receipt of the SMSNOT message 105, the SMSC 101 checks to see if it retains any short messages pending for the intended subscriber 104. If the SMSC 101 retains any short message(s) pending for the intended subscriber 104, the SMSC 101 will send a delivery request 106 to the MSC 103 identified by the routing information 203 using the short message delivery point-to-point (SMDPP) mechanism described in the IS-41. The MSC 103 delivers the pending short message(s) 110 to the subscriber 104, and sends a message delivered message 107 back to the SMSC 101. The SMSC 101, upon receipt of the message delivered message 107 indicating a successful delivery of the short message(s) 110, will forward the SMSNOT message 105 to the next SMSC 101'. If, on the other hand, no pending short message for the intended subscriber 104 is stored in the SMSC 101, then the SMSC 101 will immediately forward the SMSNOT message 105 to the next SMSC 101' upon receipt of the same.

The next SMSC 101' in turn checks to see if it has any pending short message(s) for the intended subscriber 104, and if not further forwards the SMSNOT message 105 to another (e.g., the next) SMSC in the SMS network 100 immediately or after forwarding its own pending short messages to the MSC 103 if it had at least one pending short message for the intended subscriber 104 using the procedure outlined above.

In accordance with one preferred embodiment of the present invention, the SMSNOT message 105 is forwarded from one SMSC to the next SMSC via the IS-41 protocol. Although, the IS-41 protocol is used in this example, the forwarding of the SMSNOT message 105 may be accomplished by the use of any other mechanism suitable for the particular SMS network, for example, TCP/IP, X.25, a short message peer-to-peer (SMPP) mechanism or any other point-to-point and/or peer-to-peer messaging mechanisms, allowing communications among the SMSCs.

Figure 2B:
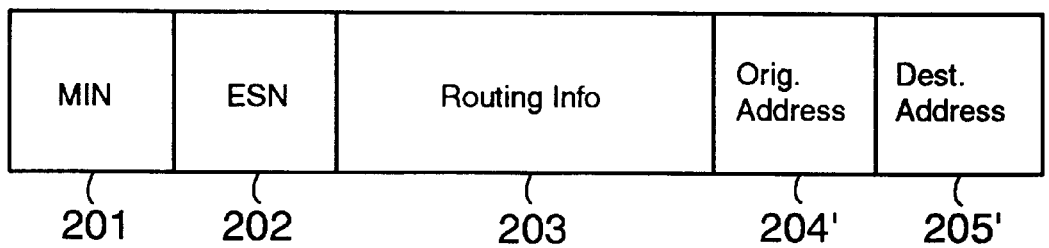
FIG. 2B shows an illustrative example of the format of a forwarded short message service notification (SMSNOT) message, in accordance with the principles of the present invention.

FIG. 2B shows a simple exemplary format of a forwarded SMSNOT message 105 using the SMPP protocol. Again, the exemplary message format of FIG. 2B is intended for illustration purposes only, and is not (and should not be construed as) the only possible format.

The SMPP forwarded SMSNOT message 105 may include the MIN 201, the ESN 202, and the routing information 203, all of which are identical to the MIN 201, the ESN 202, and the routing information 203 as shown in FIG. 2A, i.e., as the were received by SMSC 101 from the HLR 102. The SMPP is a point-to-point communication vehicle. Thus, the origination address 204' would now be the address of the SMSC 101. The destination address 205' would now be the address of the next SMSC, i.e., the SMSC 101' in the present example. Each time the SMSNOT message 105 is forwarded from one entity to an another entity, the origination address 204 and the destination address 205 reflect the address of the entity forwarding the SMSNOT message 105 and the address of the recipient entity, respectively.

FIG. 3 shows an exemplary format of a delivery request message 106. The delivery request message 106 may include, inter alia, the SMS teleservice identifier 301, the MIN 302, the ESN 303, the destination address 304, the message count 305, the SMSNOT indicator 306, the original destination address 307, the original origination address 308, and/or the origination address 309, in any order.

The SMS teleservice identifier 301 identifies the type of SMS message, e.g., a cellular messaging teleservice (CMT), a cellular paging teleservice (CPT), or voice mail notification teleservice (VMN). The CMT and the CPT both provide message delivery services. CPT further enables an originator of the short message to receive an acknowledgment of the message delivery result. The VMN provides a notification of pending voice mail message, and is initiated by the voice mail system (VMS), e.g., the VMS 508 of FIG. 5.

The MIN 302 and the ESN 303 together identify the particular intended subscriber 104 as described above. In the preferred embodiment, the delivery request message 106 is a point-to-point message, and thus includes the destination address 304 and the origination address 308 that identify the recipient and the sender of the delivery request message 106, respectively.

The SMSNOT indicator 305 identifies whether or not the SMSNOT indicator flag is set. The original destination address 306 and original origination address 307 identify the recipient and the sender of the short message, respectively.

The data 309 includes the short messages being delivered, and may further include teleservice specific information, such as, for example, priority information, language information, security information, and the number of pending voice mail messages and the like.

The message delivered message 107 may include an acknowledgment of a successful delivery of the short message or an error code in the event of delivery failure. The error code identifies a reason from a list of possible reasons for the delivery failure.

In the preferred embodiment of the present invention, the SMSNOT message 105, the delivery request message 106, and the message delivered message 107 are the short message notification (SMSNOT), short message delivery point-to-point (SMDPP) invoke, and short message delivery point-to-point result, respectively, as defined by the IS-41 standard. However, It is to be understood, and would be apparent to one skilled in the art, that any other suitable equivalent mechanism using any other standards or protocols may be used for the SMSNOT message 105, the delivery request message 106, and the message delivered message 107.

Figure 4:
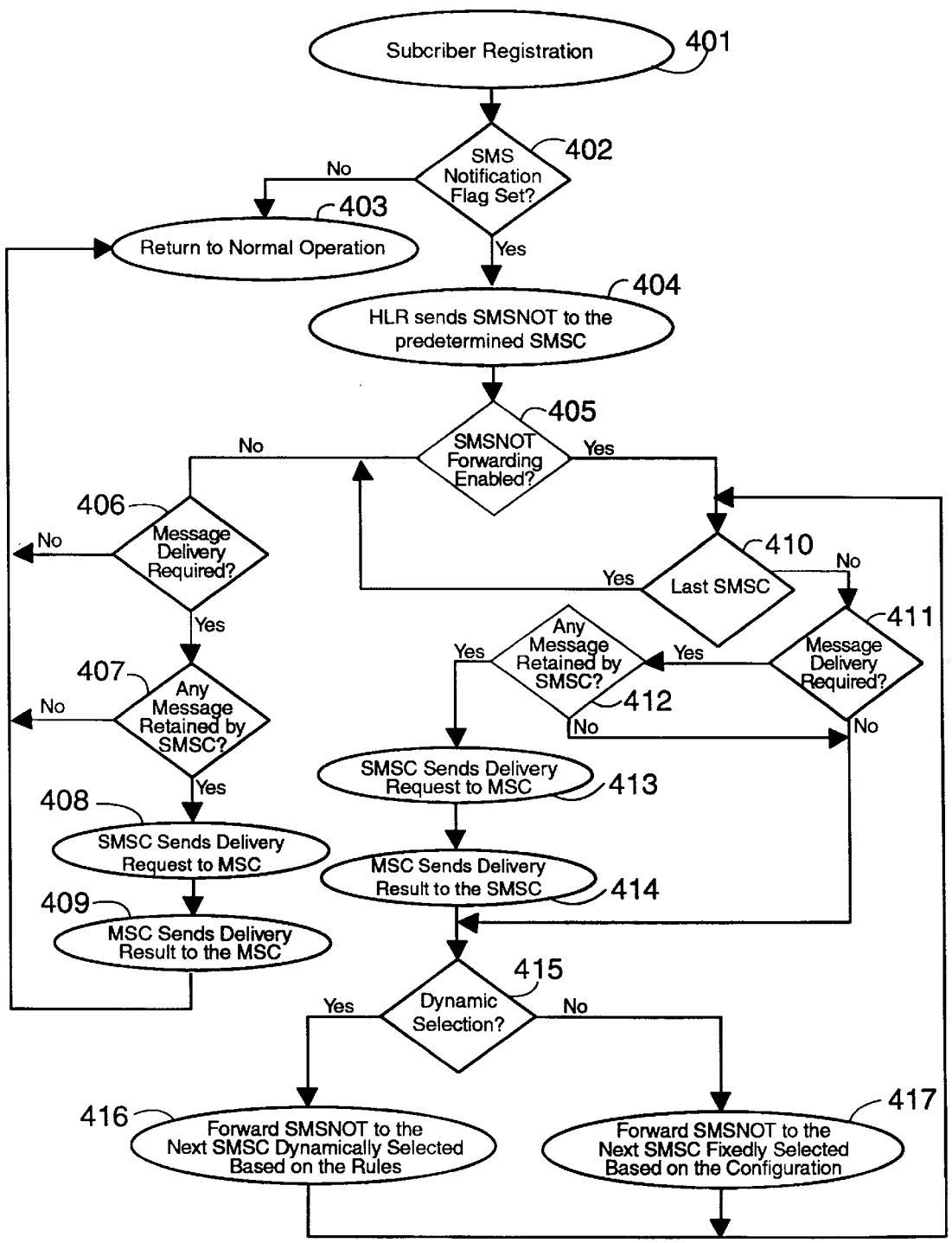
FIG. 4 shows a flow chart depicting an illustrative example of a process of pending short message delivery, in accordance with the principles of the present invention.

FIG. 4 shows an exemplary process flow of pending message delivery process in accordance with the principles of the present invention.

In particular, in step 401 of FIG. 4, when a subscriber turns on his or her handset, or comes into the service area of the network, the handset sends a registration signal as previously described.

In step 402, the HLR determines whether the SMS notification flag is set, i.e., whether or not the subscriber has at least one pending short message as a result of a previously failed delivery.

Figure 6:
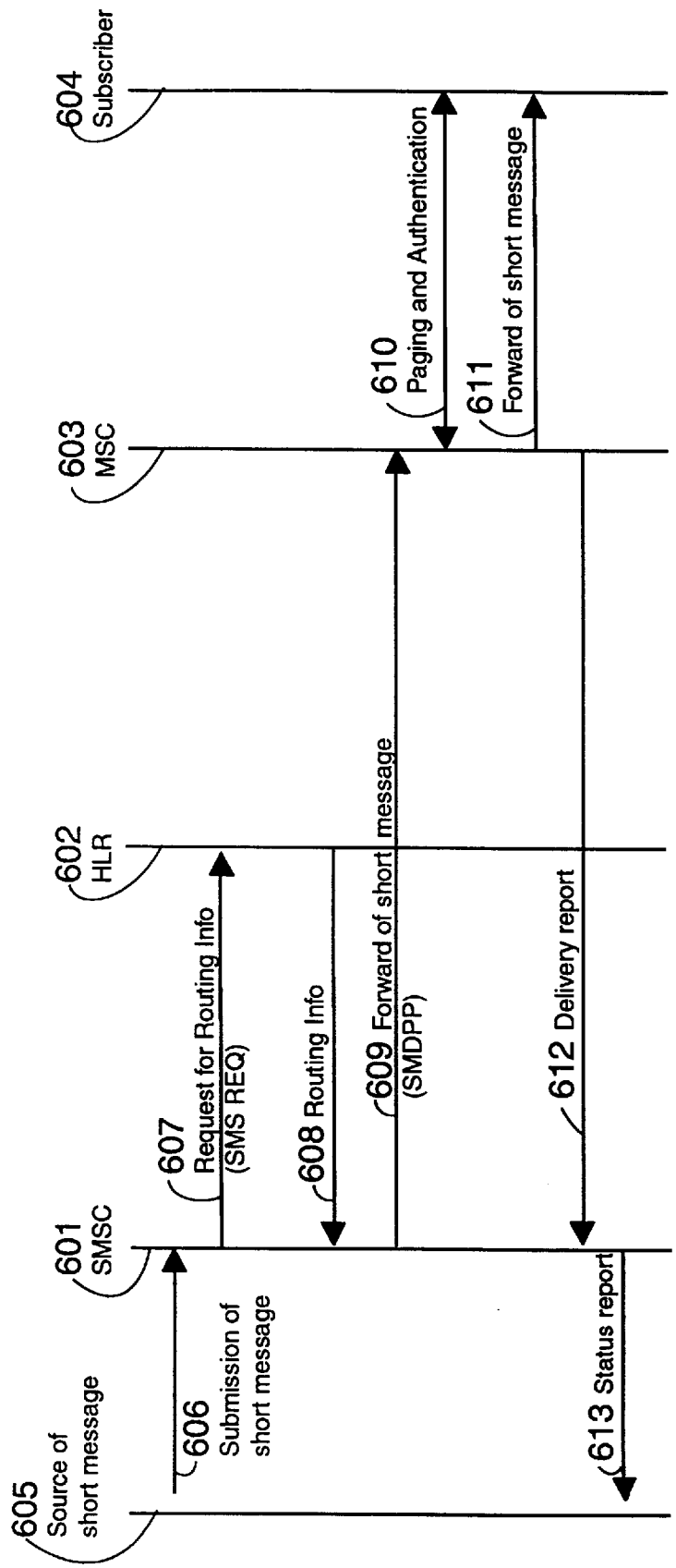
FIG. 6 shows a process of short message flow within a conventional short message service network.

If the flag is not set, in step 403, the process returns to a normal operation as described in connection with FIG. 6.

If the SMS notification flag is set, the HLR sends an SMSNOT message to the one predetermined SMSC in step 404.

In step 405, the predetermined SMSC determines whether the SMSNOT message forwarding feature is enabled. In accordance with an embodiment of the present invention, the SMSNOT message forwarding feature can be enabled or disabled at any time by, for example, the network management system or administrator. Preferably, when enabled, predetermined configuration parameters can be loaded, or allowed to be entered, to provide the order in which each of the SMSCs are to forward and receive the SMSNOT message. Moreover, according to one embodiment of the present invention, a set of intelligent rule(s) is provided. The rule(s) allow, upon an occurrence of a predetermined event such as, for example, a subscriber acquiring the multi-channel capability by paying additional fees, dynamically switching from enabled state to and from disabled state and vice versa, by changing the appropriate configuration parameters, e.g., an enable flag, to allow or disallow the forwarding of the short message service notification message.

If, in step 405, it is determined that the SMSNOT message forwarding feature is disabled, the predetermined SMSC, in step 406, checks to see its configuration parameters, and a set of intelligent rules to determine if it is required to deliver any short message(s) to the intended subscriber. The configuration parameters and the set of intelligent rules may be kept, for example, in the internal memory of the controller 126 or the memory 127 of FIG. 1A, and may require the SMSC to, for example, alert the intended subscriber of any short message(s) pending within the SMSC without actually delivering the messages.

If it is determined that message delivery is not required, the process returns to a normal operation in step 403, as previously described in connection with FIG. 6, after the SMSC performs any other tasks, e.g., alerting the intended subscriber of the existence of pending message(s), that may otherwise be required.

If, in step 406, it is determined that message delivery is required, the predetermined SMSC determines if it retains any short messages for the intended subscriber in step 407.

If the predetermined SMSC determines that it retains no messages for the intended subscriber, then the process returns to a normal operation in step 403, as previously described in connection with FIG. 6.

If, in step 407, it is determined that at least one pending message exists at the predetermined SMSC, the SMSC delivers its pending shorts message via the MSC, and receives a delivery result from the MSC, as shown in steps 408 and 409, respectively. The predetermined SMSC may further send a delivery result to the originator of the short message if the originator had requested the service.

On the other hand, if in step 405, the SMSNOT forwarding feature is enabled, in step 410, the SMSC determines whether it is the last SMSC to receive the forwarded SMSNOT message. The determination whether a particular SMSC is the last intended SMSC may be included as a configuration parameter, e.g., a flag setting in a configuration file of each of the SMSCs, or it may be determined by testing for a condition in a set of intelligent rules, e.g., testing to see if the originator address 204' (of FIG. 2B) of the forwarded SMSNOT message satisfies the condition of one or more of the intelligent rules. As will be explained further, the step 410 may be omitted for at least some of the SMSCs in the chain of forwarded SMSNOT messages if other means are utilized to ensure that all SMSCs servicing the intended subscriber are forwarded the SMSNOT message.

If, in step 410, the SMSC determines that it is the last intended SMSNOT recipient, the SMSC performs steps 406–409 as described above, and then the process returns to a normal operation in step 403.

On the other hand, if in step 410, the SMSC determines that it is not the last intended SMSNOT recipient, in step 411, the SMSC determines whether message delivery is required in a similar manner as step 406 described above.

If, in both steps 410 and 411, affirmative determinations are made, the SMSC delivers one or more messages pending within the SMSC to the intended subscriber in steps 413 and 414 in similar manner as in steps 408 and 409 as described above, and then goes on to step 415.

If a negative determination is made in either step 410 or step 412, the SMSC proceeds to step 415 without performing steps 413 and 414.

In step 415, the SMSC determines whether the next SMSC to which the SMSNOT message is to be forwarded should be selected dynamically based on satisfaction of one or more intelligent rules or fixedly selected based on the configuration parameter. The step 415 can alternatively, be omitted altogether if the selection is made always fixedly or always dynamically. If step 415 is omitted, the process would continue with either one of the step 416 or the step 417. The present example, thus, provides for a combination of fixed or dynamic selections.

In either step 416 or step 417, the SMSC forwards the SMSNOT message via the SS7 mechanism or any other mechanisms, e.g., TCP/IP, X.25, etc., as previously described to the nest SMSC selected according to the determination made in step 415.

The next SMSC to which the SMSNOT is to be forwarded by a preceding SMSC, including the initially designated SMSC which receives the SMSNOT signal from the HLR, may be fixedly configured whenever aspects of the SMS network are configured, e.g., at initial configuration, and/or during subsequent configurations, such as when one or more SMSC is being added. As an illustrative example, the plurality of SMSCs in the network may be configured in a daisy chain arrangement with respect to forwarding of the SMSNOT message.

Alternatively, the next SMSC to receive the SMSNOT signal may be determined dynamically by the preceding SMSC in accordance with an intelligent rule based on parameters, such as, for example, the type of message that was retained by the preceding SMSC, the address the intended subscriber and/or the type of the intended subscriber, etc.

Another possible alternative may be a combination of fixed and dynamic selection. That is, the selection of the next SMSC may normally be fixed, and upon the occurrence of a predetermined event, dynamic selection based on the intelligent rules may be triggered.

For example, the SMS network 100 may include a standby SMSC to take the place of a malfunctioning SMSC or an SMSC that is being serviced for maintenance. In this example, the selection of the next SMSC can be made normally using a fixed configuration of order, i.e., each of the SMSC is given the address of the subsequent SMSC to which the SMSNOT message is to be forwarded, except when a malfunctioning or maintenance event occurs. Each SMSC can check to see if such event has occurred to the respective next SMSC, and if the event has occurred, select the address of the standby SMSC as the destination address 205'. Additionally, a set of rules may be provided, for example, to determine the address of the standby SMSC, the duration or termination event for the departure from the original order of SMSCs with respect to the forwarding of the SMSNOT messages, etc.

Each of the plurality of SMSCs delivers pending short messages (if any), intended for the subscriber but retained by itself using similar process as described by steps 411 to 415, and forwards the SMSNOT signal to a fixedly and/or dynamically determined subsequent SMSC as shown in steps 415 to 417, until all SMSCs in the SMS network have received the SMSNOT message, e.g., as determined in step 410.

When the last SMSC (as determined in step 410) is forwarded the SMSNOT message, that SMSC performs steps 406 through 409 as described above, and returns the process to a normal operation in step 403. For example, if the SMSC 101 which initially received the SMSNOT message from the HLR 102 is determined to be the last intended recipient of the forwarded SMSNOT message, SMSC 101 would determine, in step 406, that message delivery is not required (since the messages has already been delivered), and proceed directly to step 403.

Each and every one of the SMSCs need not necessarily make the determination of whether all SMSCs have received the SMSNOT message. For example, the SMS network, according to the principles of the present invention, may include an SMSC, from among the plurality of SMSCs, predetermined to be the last SMSC which does not forward the SMSNOT signal. Alternatively, in another embodiment, the last SMSC may be the designated SMSC 101 (which initially received the SMSNOT message from the HLR).

The origination address 204 (of FIG. 2B) may be used to determine if the SMSNOT message has been forwarded to all SMSCs. For example, the designated SMSC 101 may determine whether or not to forward the SMSNOT message it received by determining if the origination address 204 is the address of the HLR 102 or that of an another SMSC, e.g., the address of the SMSC 101'. If the origination address 204 is the address of the HLR 102, the designated SMSC 101 forwards the SMSNOT message to the next SMSC 101' since the SMSC 101 knows that it is the only SMSC from the plurality of SMSCs to receive the SMSNOT message from the HLR 102, and thus that no other SMSC has yet received the SMSNOT message. If the designated SMSC 101 receives an SMSNOT message from another SMSC rather than the HLR 102, the designated SMSC 101 can determine that every SMSC has then received the SMSNOT message, and will not forward the SMSNOT message any further.

Figure 4A:
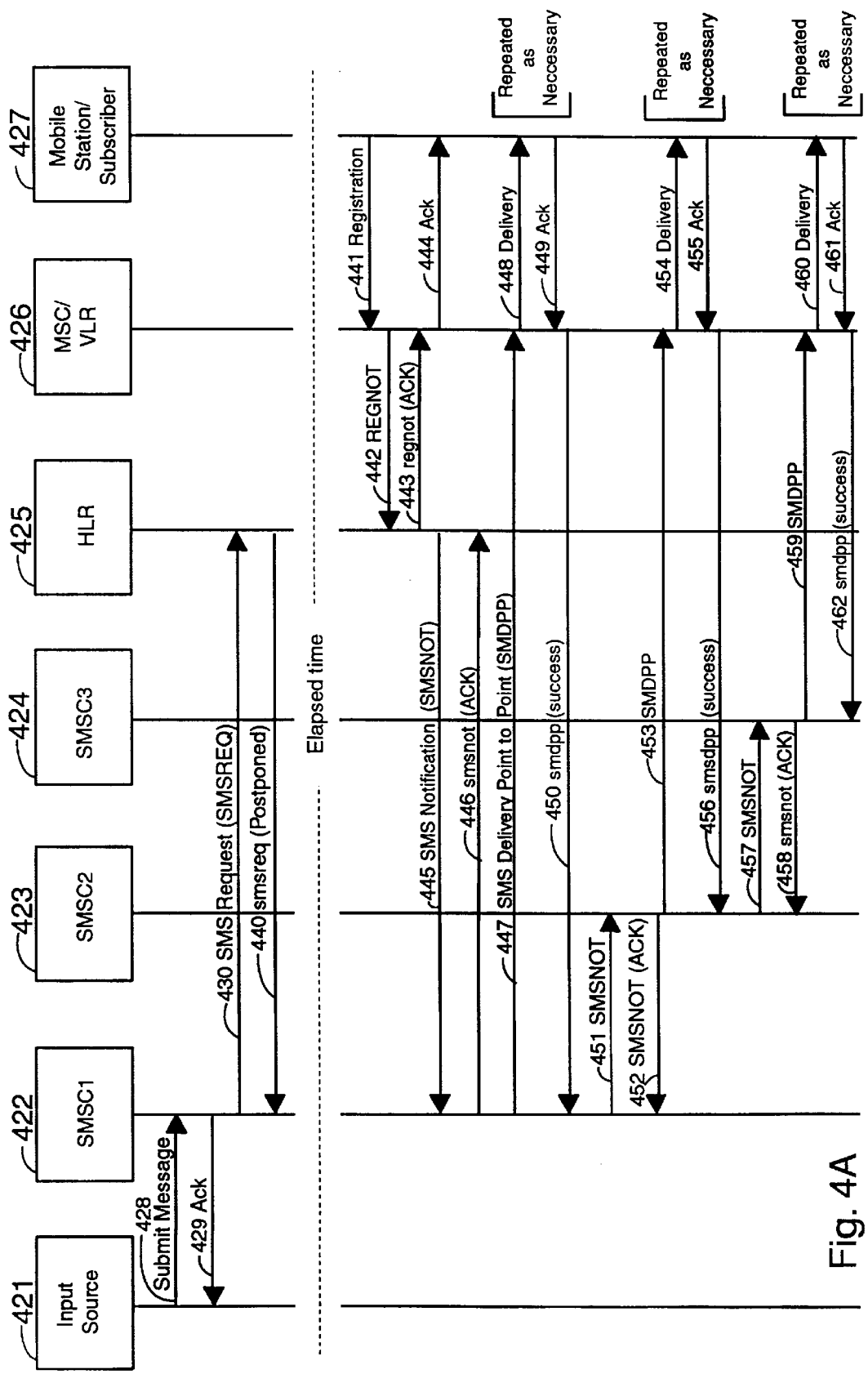
FIG. 4A shows an illustrative example of a process flow of pending short message delivery, in accordance with the principles of the present invention.

FIG. 4A shows another exemplar process involving three representative SMSCs, SMSC1, SMSC2 and SMSC3. The input source 421, e.g., any one or more of the aforementioned sources of short messages, e.g., 508–512 of FIG. 5, submits one or more short message(s) to any of the SMSCs, SMSC1 422, SMSC2 423, SMSC3 424. In FIG. 4, the SMSC1 422 is shown as the recipient SMSC. Although, in this illustrative example, only three SMSCs 422, 423 and 424 are shown, it is to be understood that the inventive SMS network may include any number of SMSCs, and that any of the SMSC may receive short messages from the input source 421.

After the recipient SMSC (SMSC1 422 in the example) receives the short message from the input source 421, the SMSC sends an acknowledgement 429 back to the input source 421, and send a SMS request (SMSREQ) 430 to the HLR 425.

The HLR 425 because it knows that the intended subscriber or mobile station 427 is not available, sends a postponement acknowledge 440 back to the SMSC1 422, and sets, if it is not already set because of a previous delivery failure, SMS notification flag for the subscriber 427. The short message is retained within the SMSC1 422 for a later delivery attempt.

After some elapse of time, the mobile station 427 may become available, e.g., is turned on or comes into the service area, and sends a registration signal 441 to the MSC/VLR 426.

Upon receiving the registration signal 441, the MSC/VLR 426 informs the HLR 425 of the availability of the subscriber 427 by sending a registration notification message (REGNOT) 442. Because at least one previous attempt to deliver a short message had failed, the HLR 425 has the SMS notification flag for the subscriber turned on. Thus, the HLR 425 sends a SMSNOT message 445 to the SMSC1 422, which is designated to receive the SMSNOT message 445 from the HLR 425. Any one SMSC among however many available SMSCs (e.g., three in the current example) may be designated to receive the SMSNOT message 445 from the HLR 425 as previously explained.

Upon receipt of the SMSNOT message 445, the SMSC1 422 checks to see if it retains any short messages pending for the intended subscriber 427. If the SMSC1 422 retains any short message(s) pending for the intended subscriber 427, the SMSC1 422 will send a delivery request SMDPP 447 to the MSC/VLR 426. The MSC/VLR 426 makes the delivery of the short message(s) 448 to the subscriber 427. The mobile station 427 sends an acknowledgement of the delivery 449 to the MSC/VLR 426 upon successfully receiving the short message(s). The delivery 448 and acknowledgement 449 may be repeated as necessary to deliver all short messages that were pending at the SMSC1 422.

The SMSC1 422, upon receipt from the MSC/VLR 426 of the SMDPP message 450 indicating a successful delivery of the short message(s), forwards the SMSNOT message 451 to a next SMSC using the various next SMSC selection methods already described above. In the current example, SMSC2 423 is selected as the next SMSC to receive the SMSNOT message forwarded by SMSC1 422.

The SMSC2 423 in turn checks to see if it has any pending short message(s) for the intended subscriber 427, and if not, further forwards the SMSNOT message 457 immediately to another SMSC (e.g., the SMSC3 424). If the SMSC2 423 had at least one pending short message for the intended subscriber 427, all short messages pending at the SMSC2 423 are delivered using the process described above in connection with delivery of messages pending at SMSC1 422, using exchanges of messages 452 through 456.

Upon delivery of all short messages that were pending at SMSC2 423 intended for the mobile station 427, the SMSC2 forwards the SMSNOT message 457 to a next SMSC, e.g., SMSC3 423 as shown. The SMSC3 423 in turn performs the delivery of any short message(s) retained therewith, and forwarding of the SMSNOT message to a next SMSC (if SMSC3 423 is not the last SMSC to receive the SMSNOT message) using the process described above.

As can be appreciated, the short message(s) stored by a plurality of SMSCs are delivered to the intended subscriber without causing collisions therebetween due to simultaneous delivery attempts made by any two or more SMSCs of the SMS network assigned to provide a short message service of some type to the intended subscriber.

The coordination of short message delivery from multiple SMSCs, and thus multiple message delivery channels to service any particular subscriber, is gained without requiring significant modification to existing SMS network elements such as the HLR, and thus without adding unnecessary complexity to the SMS network. Since no significant modification to conventional SMS network elements is required, the multiple SMSC SMS network in accordance with the principles of the present invention does not require deviation from conventional SMS network standards.

As can be appreciated further, an SMS network in accordance with the principles of the present invention allows more than one SMSC to service an individual subscriber without causing message delivery collisions, and thus provides a plurality of short message delivery channels to the individual subscriber.

The multiple SMSC capability of the SMS network in accordance with the principles of the present invention enables easy upgrading and/or expansion of the SMS network to accommodate additional subscribers and/or newer, different SMSCs. The additional SMSCs can be added to the SMS network in accordance with the principles of the present invention much more easily in comparison to the known systems, which require, inter alia, the HLR to keep track of the SMSCs.

Furthermore, because an SMS network in accordance with the principles of the present invention does not require complex tracking and determination of which SMSC is to be notified and when, deliveries of pending short messages are made much more robustly and reliably in comparison to the pending short message delivery techniques of the known multiple SMSC networks.

While the invention has been described with reference to the exemplary embodiments thereof, those skilled in the art will be able to make various modifications to the described embodiments of the invention without departing from the true spirit and scope of the invention. For example, although, throughout the preceding disclosure, examples of a home location register (HLR) sending a Short message service notification (SMSNOT) message are described, the notification may be other than a SMSNOT message, for example, the use of the alert service center mechanism in GSM system, or any other equivalent notification mechanisms, would be within such modifications that do not depart from the true spirit and scope of the present invention. Furthermore, the notification may be sent by a network entity other than the HLR, for example, a visitor location register (VLR) may instead sent a notification directly to an SMSC. The sending of the notification by a VLR instead of an HLR is also contemplated by the present invention, would equally be applicable to the preceding descriptions, examples and disclosures, and would be within such modifications that do not depart from the true spirit and scope of the present invention.

What is claimed is:

1. A short message service network for sending and receiving short messages to and from a communication device of a subscriber of said short message service network, comprising:

at least one home location register; and a plurality of short message service centers adapted to receive at least one short message service notification message from at least one other short message service center, one of said plurality of short message service centers being an only one among said plurality of short message service centers which is adapted to receive a short message service notification message from said at least one home location register, said short message service notification message indicating availability of an intended subscriber to receive said short messages.

2. A method of delivering to an intended subscriber at least one short message retained within a corresponding at least one of plurality of servicing short message service centers servicing said intended subscriber in a short message service network, comprising:

determining if said intended subscriber has become available to receive said at least one short message;

initiating delivery of said retained at least one short message to said intended subscriber by notifying from a home location register only one of said plurality of servicing short message centers that said intended subscriber is available to receive said at least one short message from any one of said plurality of servicing short message service centers; and transferring at least one short message service notification message from of said plurality of servicing short message centers to at least one other short message service center.

3. A short message service network for passing a short message relating to a communication device of a subscriber of said short message service network, comprising:

a first short message service center within said short message service network adapted to receive a short message service notification message indicating availability of an intended subscriber to receive said passed short message; and a second short message service center within said short message service network;

wherein said first short message service center is adapted to pass said short message service notification message to said second short message service center.

4. The short message service network for passing a short message relating to a communication device of a subscriber of said short message service network according to claim 3, wherein:

said first short message service center receives said short message service notification from a home location register for said short message service network.

5. The short message service network for passing a short message relating to a communication device of a subscriber of said short message service network according to claim 3, wherein:

said second short message service center is assigned to said subscriber receiving said passed short message.

6. A method of delivering at least one short message to an intended subscriber, comprising:

receiving a short message service notification message in a first short message servicing center;

forwarding said received short message service notification message to a second short message servicing center; and delivering said at least one short message to said intended subscriber.

7. The method of delivering at least one short message to an intended subscriber according to claim 6, wherein:

said at least one short message is delivered to said intended subscriber by said second short message servicing center.

8. The method of delivering at least one short message to an intended subscriber according to claim 6, wherein:

said short message service notification message received by said first short message servicing center is passed from a home location register.

9. The method of delivering at least one short message to an intended subscriber according to claim 6, wherein:

said short message service notification message indicates that said intended subscriber is able to receive short messages.

10. The method of delivering at least one short message to an intended subscriber according to claim 6, wherein:

said first short message servicing center and said second short message servicing center are comprised in a common short message service network.

11. The method of delivering at least one short message to an intended subscriber according to claim 6, further comprising:

determining if said intended subscriber has become available to receive said at least one short message.

12. The method of delivering at least one short message to an intended subscriber according to claim 11, wherein:

said determination is based on information contained in a home location register.

13. Apparatus for delivering at least one short message to an intended subscriber, comprising:

means for receiving a short message service notification message in a first short message servicing center;

means for forwarding said received short message service notification message to a second short message servicing center; and means for delivering said at least one short message to said intended subscriber.

14. The apparatus for delivering at least one short message to an intended subscriber according to claim 13, wherein:

said means for delivering said at least one short message is comprised in said second short message servicing center.

15. The apparatus for delivering at least one short message to an intended subscriber according to claim 13, further comprising:

a home location register adapted to send said short message service notification message to said means for receiving.

16. The apparatus for delivering at least one short message to an intended subscriber according to claim 13, wherein:

said short message service notification message indicates that said intended subscriber is able to receive short messages.

17. The apparatus for delivering at least one short message to an intended subscriber according to claim 13, wherein:

said first short message servicing center and said second short message servicing center are comprised in a common short message service network.

18. The apparatus for delivering at least one short message to an intended subscriber according to claim 13, further comprising:

means for determining if said intended subscriber has become available to receive said at least one short message.

19. The apparatus for delivery at least one short message to an intended subscriber according to claim 18, wherein:

said means for determining performs a determination based on information contained in a home location register.

* * * * *